US009519281B2

(12) United States Patent
Ramaswamy et al.

(10) Patent No.: US 9,519,281 B2
(45) Date of Patent: Dec. 13, 2016

(54) SYSTEM AND METHOD FOR IDENTIFICATION OF CONTACT BETWEEN AN OBJECT AND A STATIC IMPLEMENT IN A POWER TOOL

(71) Applicants: Robert Bosch Tool Corporation, Broadview, IL (US); Robert Bosch GmbH, Stuttgart (DE)

(72) Inventors: Bharadwaja Maharshi Ramaswamy, Bangalore (IN); Niranjan Sathyanarayanarao Krishnarao, Bangalore (IN); Sai Yogesh Kumar Mangapuram, Bangalore (IN); Vishwanatha Manevarthe Srikantiah, Bangalore (IN)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 565 days.

(21) Appl. No.: 13/827,606

(22) Filed: Mar. 14, 2013

(65) Prior Publication Data

US 2014/0094955 A1 Apr. 3, 2014

(30) Foreign Application Priority Data

Sep. 28, 2012 (IN) .......................... 4060/CHE/2012

(51) Int. Cl.
*G05B 19/406* (2006.01)
*B23D 59/00* (2006.01)
(Continued)

(52) U.S. Cl.
CPC ........... *G05B 19/406* (2013.01); *B23D 59/001* (2013.01); *B23Q 11/0082* (2013.01);
(Continued)

(58) Field of Classification Search
None
See application file for complete search history.

(56) References Cited

U.S. PATENT DOCUMENTS 5,212,392 A 5/1993 Berkcan et al.
7,536,238 B2 5/2009 Gass
(Continued)

FOREIGN PATENT DOCUMENTS

JP 2004188684 A 7/2004

OTHER PUBLICATIONS

International Search Report and Written Opinion corresponding to PCT Application No. PCT/IN/2013/000589, mailed Mar. 6, 2014 (13 pages).

*Primary Examiner* — Mohammad Ali
*Assistant Examiner* — Kelvin Booker
(74) *Attorney, Agent, or Firm* — Maginot Moore & Beck LLP (57) ABSTRACT

A method for operating a power tool detects human contact with a non-moving implement of the power tool. The method includes sampling an electrical signal that passes through the non-moving implement, identifying in-phase and quadrature phase components for the sample, identifying a first distance between the components of the sample and a centroid of a cluster of samples corresponding to human contact with the non-moving implement, identifying a second distance between the components of the sample and a second centroid identified for another cluster of samples corresponding to no human contact with the non-moving implement, and identifying human contact with the non-moving implement with reference to the first distance being less than the second distance.

10 Claims, 5 Drawing Sheets

(51) Int. Cl.
   *B27G 19/02* (2006.01)
   *B23Q 11/00* (2006.01)
   *B23Q 17/24* (2006.01)
   *B27G 21/00* (2006.01)
(52) U.S. Cl.
   CPC ......... *B23Q 17/2438* (2013.01); *B27G 19/02* (2013.01); *B27G 21/00* (2013.01)

(56) References Cited

U.S. PATENT DOCUMENTS

| | | | |
|---|---|---|---|
| 7,739,934 B2 | 6/2010 | Tetelbaum et al. | |
| 7,804,204 B1 * | 9/2010 | Shafer et al. | 307/326 |
| 7,888,826 B1 * | 2/2011 | Shafer et al. | |
| 9,062,827 B2 * | 6/2015 | Krishnarao et al. | |
| 2002/0064233 A1 * | 5/2002 | Terreault | H04L 1/206 375/261 |
| 2004/0119484 A1 * | 6/2004 | Basir et al. | 324/680 |
| 2004/0123709 A1 * | 7/2004 | Metzger, Jr. | 83/76.1 |
| 2004/0226424 A1 * | 11/2004 | O'Banion et al. | 83/397 |
| 2006/0101960 A1 * | 5/2006 | Smith et al. | 83/58 |
| 2009/0236012 A1 * | 9/2009 | Gass et al. | 144/427 |
| 2009/0241748 A1 * | 10/2009 | Keller et al. | 83/522.13 |
| 2010/0059144 A1 * | 3/2010 | Tetelbaum et al. | 144/356 |
| 2010/0072261 A1 * | 3/2010 | Cruz et al. | 228/102 |
| 2010/0206145 A1 | 8/2010 | Tetelbaum et al. | |
| 2010/0225449 A1 * | 9/2010 | Hartmann | G06K 19/0675 340/10.4 |
| 2011/0050248 A1 * | 3/2011 | Bray | G01B 15/02 324/644 |
| 2011/0079339 A1 * | 4/2011 | Cruz et al. | 156/64 |
| 2011/0113939 A1 * | 5/2011 | Simon | 83/13 |
| 2013/0011180 A1 * | 1/2013 | Borghi | 403/78 |
| 2014/0090530 A1 * | 4/2014 | Haldar et al. | 83/63 |
| 2014/0090860 A1 * | 4/2014 | Ramaswamy et al. | 173/2 |
| 2014/0090948 A1 * | 4/2014 | Krishnarao et al. | 192/130 |
| 2014/0094956 A1 * | 4/2014 | Ramaswamy et al. | 700/177 |
| 2014/0094957 A1 * | 4/2014 | Mangapuram et al. | 700/186 |

* cited by examiner

SYSTEM AND METHOD FOR IDENTIFICATION OF CONTACT BETWEEN AN OBJECT AND A STATIC IMPLEMENT IN A POWER TOOL

CLAIM OF PRIORITY

This application claims priority to a pending Indian application with serial number 4060/CHE/2012, which is entitled "SYSTEM AND METHOD FOR IDENTIFICATION OF CONTACT BETWEEN AN OBJECT AND A STATIC IMPLEMENT IN A POWER TOOL," and was filed on Sep. 28, 2012.

TECHNICAL FIELD

This disclosure relates generally to power tools, and, more specifically, to systems and methods for detecting contact between a human and a non-moving implement in a power tool.

BACKGROUND

Detection or sensing systems have been developed for use with various kinds of manufacturing equipment and power tools. Such detection systems are operable to trigger a reaction device by detecting or sensing the proximity or contact of some appendage of an operator with some part of the equipment. For example, existing capacitive contact sensing systems in table saws detect contact between the operator and the blade.

Figure 1:
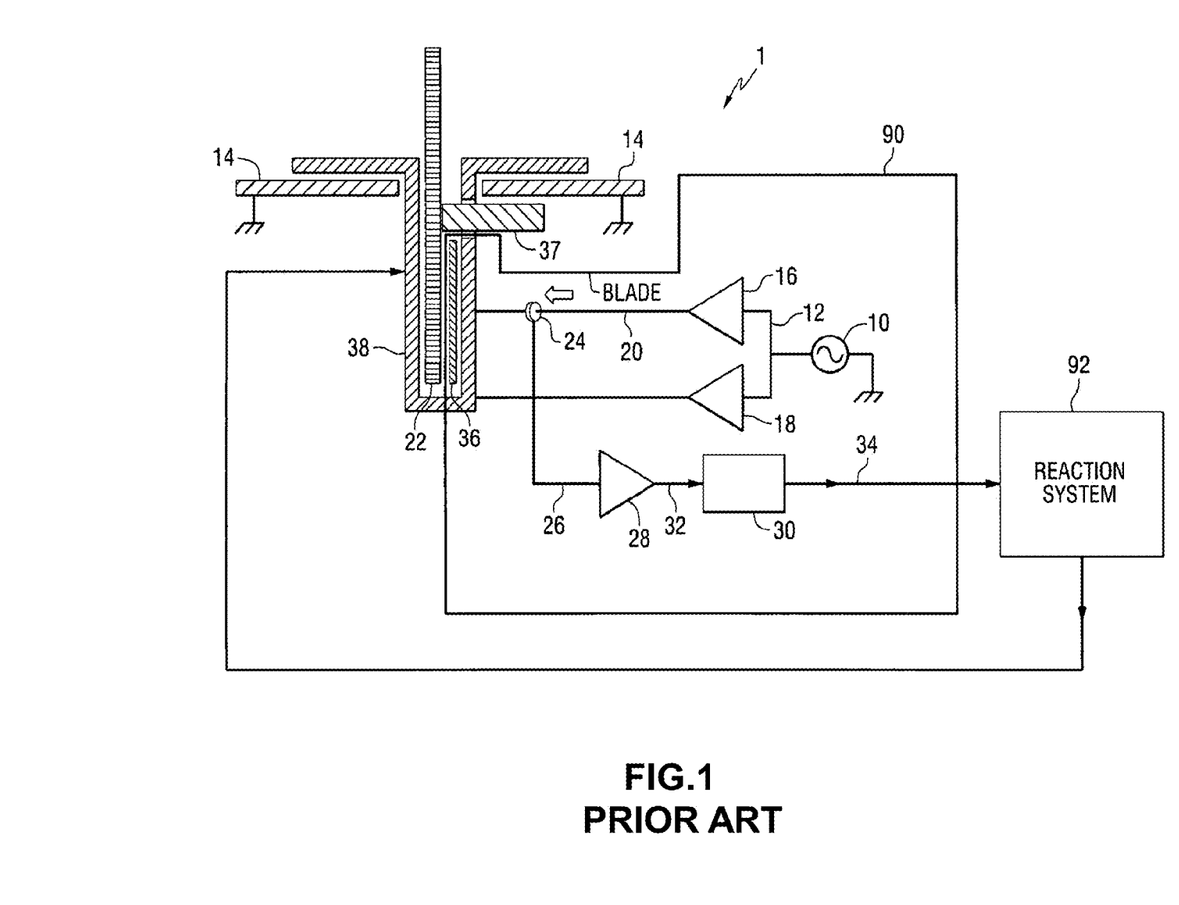
FIG. 1 is a diagram of a prior art table saw including a prior art detection system for detecting contact between a human and a saw blade.

FIG. 1 depicts a prior art capacitive sensing based detection system 90 that is incorporated with a table saw 1. The detection system 90 drives an excitation voltage that is electrically coupled to a movable blade 22 of the saw 1, and detects the current drawn from the blade 22. The amplitude or phase of the detected current and/or excitation voltage changes when the blade 22 comes into contact with an electrically conductive object (such as an operator's hand, finger or other body part, as well as work pieces). The characteristics of the changes are used to trigger the operation of a reaction system 92. The reaction system 92 disables operation of the blade 22 by, for example, applying a brake to cease motion of the blade 22 and/or by dropping or otherwise removing the blade 22 from the cutting area. One example of a reaction system 92 uses an explosive charge to drive a stopper (not shown) into the blade 22 to arrest the motion of the blade 22. In addition, or instead, an embodiment of the reaction system 92 drops or collapses a blade support member (not show) to urge the blade 22 below the surface of the table 14.

The embodiment of the detection system 90 shown in FIG. 1 includes an oscillator 10 that generates a time-varying signal on line 12. The time-varying signal is any suitable signal type including, for example, a sine wave, a sum of multiple sine waves, a chirp waveform, a noise signal, etc. The frequency of the signal is chosen to enable a detection system to distinguish between contact with the first object, such as a finger or hand, and a second object, such as wood or other material, to be cut by the power tool. In the embodiment of FIG. 1, the frequency is 1.22 MHz, but other frequencies can also be used, as well as non-sinusoidal wave shapes. The oscillator 10 is referenced to the saw table 14 or other metallic structure as a local ground. As shown in FIG. 1, the blade 22 is disposed vertically in an opening defined by the saw table 14 (or work surface or cutting surface or platform).

The oscillator 10 is connected to two voltage amplifiers or buffers 16, 18 through the line 12. The first voltage amplifier 16 has an output connected to line 20, which operatively couples the output of the oscillator to the saw blade 22. A current sensor 24 operatively couples a signal from line 20 onto line 26 that is fed to an amplifier 28, which is connected to a processor 30 by line 32. The current sensor 24 is, for example, a current sense transformer, a current sense resistor, a Hall Effect current sense device, or other suitable type of current sensor. An output line 34 from the processor 30 is operatively connected to the reaction system 92 so that the processor 30 triggers the reaction system 92 if predetermined conditions are detected indicating, for example, contact between the blade 22 and the first object.

The signal on line 26 is indicative of the instantaneous current drawn by the blade 22. Because the saw blade 22 is in motion during operation of the table saw, the connection is made through an excitation plate 36, which is mounted generally parallel to the blade 22. The plate 36 is driven by the first voltage amplifier 16, and is configured with a capacitance of approximately 100 picoFarad (pF) relative to the blade 22 in the embodiment of FIG. 1. The plate 36 is held in a stable position relative to the side of the blade 22. The excitation plate 36 is configured to follow the blade 22 as the height and bevel angle of the blade 22 are adjusted during operation of the saw 1.

The capacitance between the first object and the saw table 14 (or power line ground if one is present) is in the range of approximately 30-50 pF in the embodiment of FIG. 1. When the capacitance between the excitation plate 36 and the saw blade 22 exceeds the capacitance between the first object and the saw table 14, the detection thresholds are not unduly affected by changes in the plate-to-blade capacitance. In the configuration of FIG. 1, the plate 36 is arranged in parallel with the blade 22 on the side where the blade 22 rests against the arbor 37, so that changes in blade thickness do not affect the clearance between the blade 22 and the plate 36. Other methods of excitation, including contact through the arbor bearings or brush contact with the shaft or the blade, could be used to the same effect.

In the detection system 90, the second-amplifier 18 is connected to a shield 38, and the amplifier 18 drives the shield 38 to the same potential as the excitation plate 36. Also, sensors in the detection system 90 optionally monitor the level of electrical current drawn by the shield 38. The shield 38 extends around the blade 22 underneath the table 14, and is spaced some distance away from the blade 22 on the top of the table 14 in the configuration of FIG. 1. The configuration of the shield 38 reduces the static capacitance between the blade 22 and the table 14, which acts as a ground plane if the table is not electrically connected to an earth ground. In various embodiments, the shield 38 is a continuous pocket of mesh, or some other type of guard that is electrically equivalent to a Faraday cage at the excitation frequencies generated by the oscillator 10. The shield 38 optionally includes a component that moves with the blade adjustments, or is large enough to accommodate the blade's adjustment as well as the various blades that fitted on the table saw. In the configuration of FIG. 1, the shield 38 moves with the blade adjustments, and includes a throat plate area of the table top 14.

The processor 30 performs various pre-processing steps and implements an adaptive trigger that enables detection of conditions indicative of contact between the first object and the blade 22. The processor 30 optionally includes one or more associated analog-to-digital (A/D) converters. The blade current signal from the current sensor 24 is directed to one or more of the A/D converters, which generate a corresponding digital signal. A blade voltage signal representing the voltage drop between the blade 22 and the excitation plate 36 is directed an A/D converter to generate a digital blade voltage signal in some embodiments. The processor 30 receives the digitized signal and performs various digital signal processing operations and/or computes derivative parameters based on the received signal. The processor 30 analyzes or otherwise performs operations on the conditioned blade signal to detect conditions indicative of contact between the first object and the blade 22.

Existing detection systems, such as the system 90 of FIG. 1, are configured for use when the power tool is operating to move an implement. For example, in the saw 1, the detection system 90 identifies contact between the moving saw blade and an object based on a transient signal, such as a spike in the digital blade voltage signal. The transient signal occurs over a short time, but system 90 recognizes the signal and the processor 30 takes appropriate actions within a brief time period of the contact between the blade and the object. When the saw blade is not moving, however, the transient signal still occurs if the signal is being passed through the blade, but the signal quickly returns to a similar level from before the contact occurred, and the detection system 90 cannot effectively identify long-term contact between the object and the implement. Additionally, if the object is already in contact with the static implement when the oscillator 10 begins generating the signal, then the detection system 90 does not detect the transient signal corresponding to initial contact between the object and the implement. For example, if an operator holds the saw blade 22 while the saw blade 22 is not moving, the sensing system 90 cannot identify the prolonged contact between the hand of the operator and the static blade 22. Consequently, improvements to power tools that enable identification of contact between an object and a non-moving implement in the power tool would be beneficial.

SUMMARY

In one embodiment, a method for identifying contact between a non-moving implement in a power tool and a human has been developed. The method includes generating a sample of an electrical signal that passes through the non-moving implement, identifying an in-phase component and quadrature phase component of the sample, identifying a first distance between the identified in-phase component and quadrature phase component of the sample and a first centroid identified for a cluster of samples corresponding to human contact with the non-moving implement with reference to the in-phase component and quadrature phase component of the sample and an in-phase component and a quadrature phase component of the first centroid, identifying a second distance between the identified in-phase component and quadrature phase component of the sample and a second centroid identified for another cluster of samples corresponding to no human contact with the non-moving implement with reference to the in-phase component and quadrature phase component of the sample and an in-phase component and a quadrature phase component of the second centroid, and identifying human contact with the non-moving implement with reference to the first distance being less than the second distance.

In another embodiment, a power tool that is configured to detect contact between a human and a non-moving implement in the power tool has been developed. The power tool includes an actuator configured to move an implement, a clock source configured to generate a time varying electrical signal that passes through the implement, and a controller operatively connected to the actuator and configured to sample the electrical signal. The controller is configured to generate a sample of the electrical signal when the actuator is deactivated and the implement is a non-moving implement, identify an in-phase component and quadrature phase component of the sample, identify a first distance between the identified in-phase component and quadrature phase component of the sample and a first centroid identified for a cluster of samples corresponding to human contact with the non-moving implement with reference to the in-phase component and quadrature phase component of the sample and an in-phase component and a quadrature phase component of the first centroid, identify a second distance between the identified in-phase component and quadrature phase component of the sample and a second centroid identified for another cluster of samples corresponding to no human contact with the non-moving implement with reference to the in-phase component and quadrature phase component of the sample and an in-phase component and a quadrature phase component of the second centroid, and identify human contact with the non-moving implement with reference to the first distance being less than the second distance.

In another embodiment, a method of identifying criteria for detecting human contact with a non-moving implement of a power tool has been developed. The method includes electrically coupling an electrical current into the non-moving implement of the power tool, sampling the electrical signal to obtain multiple samples of the electrical signal electrically coupled to the non-moving implement during a first time period during which no human contact with the non-moving blade occurs, sampling the electrical signal to obtain multiple samples of the electrical signal electrically coupled to the non-moving implement during a second time period during which human contact with the non-moving blade occurs, identifying a first centroid for the multiple samples of the electrical signal obtained during the first time period, identifying a second centroid for the multiple samples of the electrical signal obtained during the second time period, and storing the first centroid and the second centroid in a memory within the power tool for reference to detect human contact with the non-moving implement.

DETAILED DESCRIPTION

For the purposes of promoting an understanding of the principles of the embodiments described herein, reference is now made to the drawings and descriptions in the following written specification. No limitation to the scope of the subject matter is intended by these references. This patent also encompasses any alterations and modifications to the illustrated embodiments as well as further applications of the principles of the described embodiments as would normally occur to one skilled in the art to which this document pertains.

As used herein, the term "power tool" refers to any tool with one or more moving parts that are moved by an actuator, such as an electric motor, an internal combustion engine, a hydraulic or pneumatic cylinder, and the like. For example, power tools include, but are not limited to, bevel saws, miter saws, table saws, circular saws, reciprocating saws, jig saws, band saws, cold saws, cutters, impact drives, angler grinders, drills, jointers, nail drivers, sanders, trimmers, and routers. As used herein, the term "implement" refers to a moving part of the power tool that is at least partially exposed during operation of the power tool. Examples of implements in power tools include, but are not limited to, rotating and reciprocating saw blades, drill bits, routing bits, grinding disks, grinding wheels, and the like. As described below, a sensing circuit integrated with a power tool is used to halt the movement of the implement to avoid contact between a human operator and the implement while the implement is moving. As used herein, the term "static implement" refers to an implement in a power tool that is not moving. For example, a saw blade that is not moving when a saw is deactivated or a drill bit that is not rotating when a drill is deactivated are static implements.

As used herein, the term "centroid" refers to an average value for a plurality of signal samples that include in-phase and quadrature phase components. The centroid value includes both an average in-phase component and average quadrature phase component identified from the in-phase and quadrature phase components, respectively, in the plurality of samples. A centroid can be represented as a location within a cluster of samples that are identified using a clustering technique that is known to the art. As described in more detail below, the distance between centroids of multiple signal samples that are represented in a two-dimensional plane defined by the in-phase component and quadrature phase component of the samples are used to identify if a static member in a power tool is in contact with an object, such as a portion of a human body.

Figure 2:
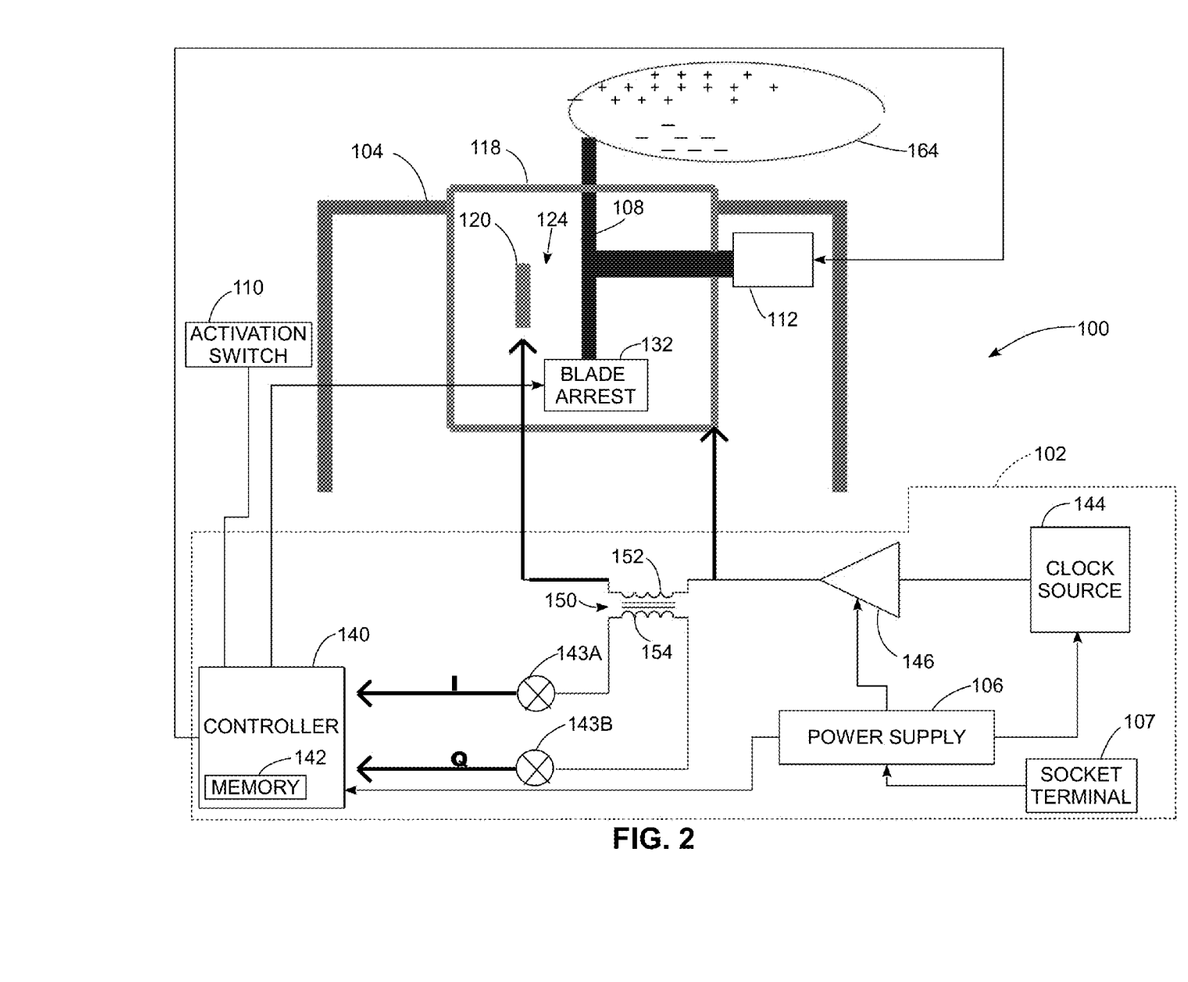
FIG. 2 is a block diagram of a table saw that is configured to identify if a saw blade in the saw is in contact with an object prior to rotating the saw blade.

FIG. 2 depicts a table saw 100. The table saw 100 includes a table 104 through which a saw blade 108 extends for cutting work pieces, such as pieces of wood. The table saw 100 also includes an electric motor 112, a blade enclosure 118, and a blade arrest device 132. A plate 120 and the blade 108 form a capacitor 124 where a small air gap between the plate 120 and the blade 108 acts as a dielectric. In different embodiments, the plate 120 is or includes a capacitive, resistive, projective capacitive, optical, thermal, near infrared or other suitable sensing mechanism that either senses contact between the blade and an object or detects an object that approaches the blade 108. The blade enclosure 118 is electrically connected to the saw blade 108. The general configuration of the table 104, blade 108, and motor 112 are well known to the art for use in cutting work pieces and are not described in greater detail herein. Some components that are commonly used in table saws, such as guides for work pieces, blade height adjustment mechanisms, and blade guards are omitted from FIG. 2 for clarity.

The saw 100 includes a printed circuit card 102 to which a sensing circuit, which includes a clock source 144, driver amplifier 146, transformer 150 and a controller 140, are mounted. An electrical terminal socket 107, which is mounted on the printed circuit card 102 in FIG. 2 or otherwise electrically connected to the switched power supply 106 in another embodiment, receives an alternating current (AC) electrical power signal from an external power source, such as a generator or electrical utility provider. The switched power supply 106 converts the AC power signal from the external power source to a direct current (DC) electrical power signal at one or more voltage levels to supply power to the controller 140, clock source 144, and amplifier 146. The printed circuit card 102 and the components mounted on the printed circuit card 102 are electrically isolated from an earth ground. The power supply 106 serves as a local ground for the components mounted to the printed circuit card 102.

In the saw 100, the clock source 144 and driving amplifier 146 in the sensing circuit generate a time varying electrical signal that is directed through a primary winding 152 in the transformer 150, the plate 120, the blade 108, and the blade enclosure 118. The time varying electrical signal is referred to as a "sensing current" because the controller 140 senses contact between the blade 108 and a portion of a human body with reference to changes in the magnitude of the sensing current. The time varying electrical signal is a complex valued signal that includes both an in-phase component and quadrature component. The sensing current passes through the primary winding 152 in the transformer 150 to the plate 120. The changes in the primary winding caused by discharges between the plate 120 and the blade 108 produce an excitation signal in the secondary winding 154 of the transformer 150. The excitation signal is another complex valued signal that corresponds to the sensing current passing through the primary winding 152.

The controller 140 in the sensing circuit is operatively connected to the motor 112, the secondary winding 154 in the transformer 150, a mechanical blade arresting device 132. The controller 140 includes one or more digital logic devices including general purpose central processing units (CPUs), microcontrollers, digital signal processors (DSPs), analog to digital converters (ADCs), field programmable gate arrays (FPGAs), application specific integrated circuits (ASICs) and any other digital logic devices that are suitable for operation of the saw 100. The controller 140 includes a memory 142 that stores programmed instructions for the operation of the controller 140, and data corresponding to centroids of clustered signal samples that are generated when an object with electrical characteristics corresponding to the human body contacts the saw blade 108, and when no objects contact the saw blade 108.

During operation of the sensing circuit, the clock source 144 generates a time varying signal, such as sinusoidal waveform, at a predetermined frequency. In the embodiment of FIG. 2, the clock source 144 is configured to generate a signal at a frequency of 1.22 MHz, which is known to propagate through the human body. The amplifier 146 generates the sensing current as an amplified version of the signal from the clock source 144 with sufficient amplitude to drive the transformer 150 and capacitor 124 for detection by the controller 140.

During operation of the sensing circuit, the controller 140 receives the in-phase component I of the excitation signal in the secondary winding 154 through a first demodulator 143A and the quadrature component Q of the excitation signal through a second demodulator 143B. The transformer 150 isolates the sensing current flowing through the primary winding 152, plate 120, saw blade 108, and blade enclosure 118 from demodulators 143A and 143B that supply the in-phase and quadrature phase components of the signal, respectively, to the controller 140. Since the demodulators 143A and 143B generate electrical noise, the transformer 150 reduces or eliminates the effects of the noise on the primary winding 152 and sensing current. In one configuration, the transformer 150 is a 1:1 transformer where the primary winding 152 and secondary winding 154 have an equal number of turns. In alternative configurations, the ratio of windings in the primary winding 152 and secondary winding 154 are selected to either step-up or step-down the signal for demodulation and monitoring by the controller 140. The controller 140 includes one or more ADCs, filters, and other signal processing devices required to generate digital representations of the magnitude of the in-phase signal I and quadrature signal Q. The controller 140 identifies a magnitude of the sensing current A at a given time as a Pythagorean sum of the in-phase and quadrature components in each sample, as illustrated in the following equation: $A=\sqrt{I^2+Q^2}$. The controller 140 measures the demodulated signal at a predetermined frequency, such as a 100 KHz sampling rate, to identify changes in the magnitude A of the complex valued signal.

As the motor 112 rotates the blade 108, the rotating blade 108 comes into contact with different objects, including blocks of wood and other work pieces. A small portion of the charge that accumulates on the blade 108 flows into the work piece. The electrical conductivity of the wood work piece is, however, quite low, and the controller 140 in the sensing circuit continues to enable the motor 112 to rotate the saw blade 108. For example, when the blade 108 engages a block of wood, the controller 140 typically measures a small change in the sensing current A, but the change in the sensing current is identified as corresponding to wood or another material with low electrical conductivity.

While work pieces, such as wood, have low electrical conductivity, another object, such as a part of the human body, has a much higher electrical conductivity and absorbs a much greater portion of the charge on the blade 108 as the part approaches the blade 108. In FIG. 2 a portion of a human body 164, such as a hand, finger, or arm, is represented by a charge cloud indicating the flow of charge from the blade 108 to the human body. The controller 140 identifies imminent contact between the human body 164 and the blade 108 as a rapid change in the magnitude A of the sensing current at the time when the human body 164 nears the blade 108. In response to the rapid change in the magnitude of the sensing signal, the controller 140 deactivates the motor 112, engages the blade arrest device 132 to halt the motion of the blade 108, and optionally retracts the blade 108 before the blade contacts the human body 164.

In the configuration of FIG. 2, the saw blade 108 is a circular saw blade with a plurality of teeth arranged around the circumference of the blade. The teeth engage work pieces to cut the work pieces during normal operation of the saw. The teeth in the blade 108 also accumulate electrical charge from the sensing current. The teeth on the saw blade facilitate discharge of the electrical charge accumulated on the saw blade 108 to the human body 164 as the human body approaches the saw blade 108. In some configurations, an electrical arc between the human body 164 and the tips of the teeth in the saw blade 108 enables the charge accumulated on the blade 108 to flow into the human 164 prior to the human 164 actually contacting the blade 108. The arc distance is typically on the order of a few millimeters. The controller 140 identifies the change in the magnitude A of the sensing current and halts the blade 108 in response to discharge from the blade 108 due either to direct contact or close proximity between the human 164 and the blade 108.

In the configuration of FIG. 2, the human body has sufficient conductivity and capacity to draw charge from the blade 108 even when the printed circuit card 102 is isolated from earth ground and when the human body 164 is isolated from earth ground, such as when a human operator wears shoes with rubber soles. Thus, while the printed circuit card 102 and the human 164 do not share a common electrical ground, the controller 140 continues to identify contact between the human 164 and the blade 108 through identification of a rapid change in the identified sensing current amplitude A. While the absolute value of the amplitude A may vary during operation of the saw 100, the controller 140 can still identify contact with the human 164 in response to the magnitude and time of the change in the relative value of the amplitude A. During operation of the saw 100, the controller 140 is configured to identify contact with the human 164 and to deactivate the motor 112 and engage the blade arrest mechanism 132 to halt the saw blade 108 in a time period of approximately 1 millisecond.

In the saw 100, the controller 140 deactivates the electrical motor 112 in response to identification of contact between the blade 108 and a portion of a human. In the saw 100, the saw blade 108 generally continues rotating for a period of several seconds due to the momentum that the saw blade 108 accumulates during operation. The blade arrest device 132 is configured to either halt the saw blade 108 in a much shorter period of time, to drop the saw blade 108 below the table 104 to retract the saw blade 108 from contact with the human, or to both halt and retract the blade 108. In the saw 100, the blade arrest 132 includes a brake mechanism that halts the rotation of the blade 108. Additionally, the blade arrest 132 withdraws the blade 108 below the surface of the table 104. In other power tool embodiments, the moving implement halts in a short period of time after deactivation of an actuator without the requirement for an additional brake mechanism.

In addition to sensing contact between an object and the saw blade 108 when the saw blade 108 is moving, the sensing circuit in the saw 100 is configured to identify contact between the saw blade 108 and an object, such as a portion of the human body 164, when the saw blade 108 is static. In particular, the controller 140 is configured to identify if an object is in contact with the static saw blade 108 when an operator closes an activation switch 110 to begin using the saw 100. As described in more detail below, the controller 140 activates the sensing current through the blade 108 after the activation switch 110 is closed and identifies if an object, such as the human 164, is in contact with the blade 108. The controller 140 identifies contact with reference to the in-phase and quadrature phase components identified for one or more samples of the sensing current and predetermined in-phase and quadrature phase data stored in the memory 142.

The controller 140 only activates the electric motor 112 to rotate the blade 108 if the blade 108 is not in contact with the human 164 or an object other than a work piece, such as a piece of wood. If the controller 140 identifies that the blade 108 is in contact with the human 164, then the controller 140 locks out the motor 112. To lock out the motor 112, the controller 140 disables operation of the motor 112 and does not reactivate the motor 112 until an appropriate manual action is taken to ensure that objects are removed from proximity with the saw blade 108. The controller 140 optionally generates an alarm, such as an audible or visual indicator, indicating that the electric motor 112 is locked out and that the operator should take an appropriate action to re-enable the saw 100.

FIG. 2 depicts a table saw as an illustrative example of a power tool that is configured to identify contact between a portion of a human body or other object and a static implement, which is the saw blade 108 when the saw blade 108 is not moving in the saw 100. Alternative embodiments are envisioned that incorporate the sensing circuit of FIG. 2 into a wide range of power tools including, but not limited to, handheld electric drills, drill presses, handheld circular saws, reciprocating saws, band saws, routers, grinders, and any other power tool with static implements that contact objects when the power tool is deactivated.

Figure 3:
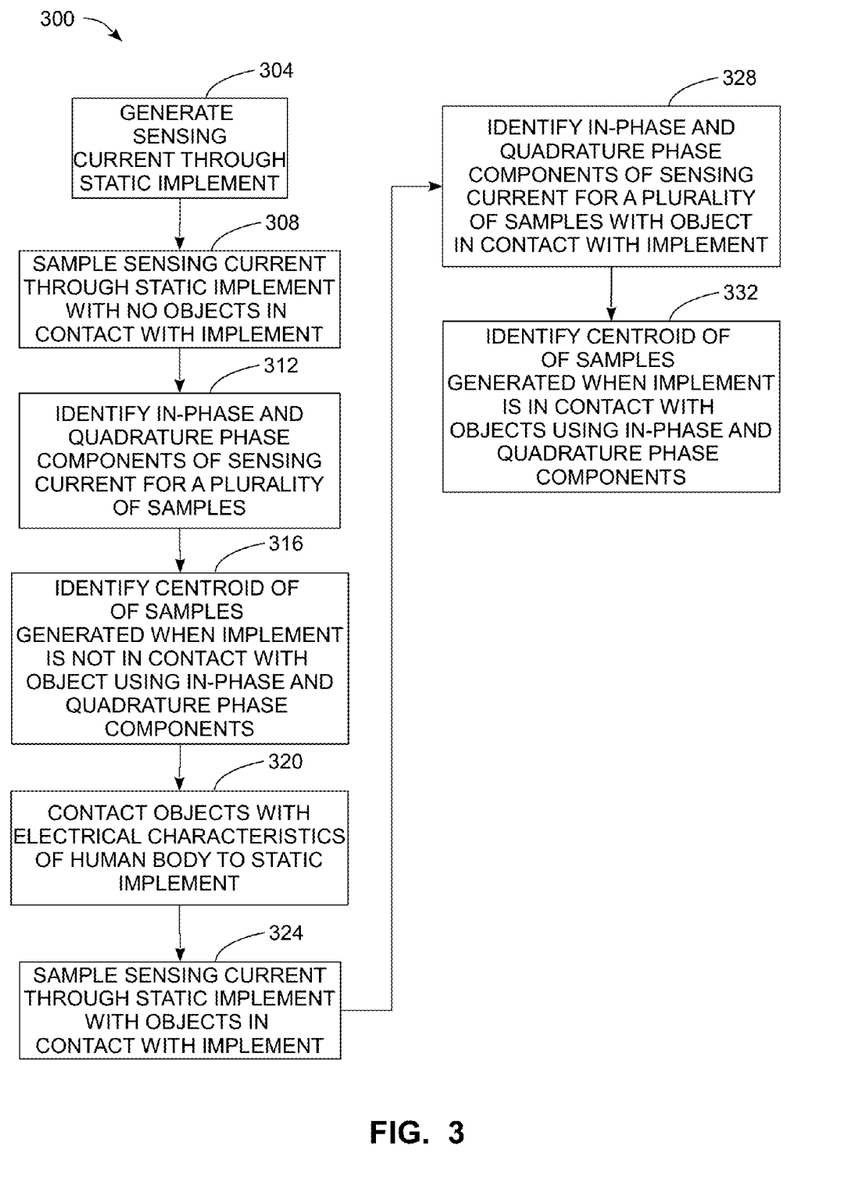
FIG. 3 is a flow diagram of a process for characterizing differences between a complex valued electrical signal that flows through a static implement in a power tool when the implement is not in contact with an object and when the implement is in contact with an object.

FIG. 3 depicts a process 300 for characterizing changes that occur in the electrical sensing signal when an object contacts a static implement in a power tool. FIG. 3 is described in conjunction with the saw 100 of FIG. 2 for illustrative purposes. In the discussion below, a reference to the process 300 performing a function or action refers to one or more processors, such as the controller 140, executing programmed instructions stored in a memory to operate components of the power tool to perform the function or action.

Process 300 begins as the power tool generates the electrical signal for the sensing current through that is passed through the implement (block 304). As described above with reference to FIG. 2, the amplified time varying electrical signal from the clock source 144 and amplifier 146 passes through the transformer 150 and the capacitor 124 formed from the plate 120 and the saw blade 108.

During process 300, the controller 140 samples the sensing current through the static implement (block 308). In the saw 100, the controller 140 samples both the in-phase component I and quadrature component Q of the sensing current that is passed through the secondary winding 154 in the transformer 150. The sensing current passing through the primary winding 152 generates a corresponding excitation current in the secondary winding 154, and the demodulators 143A and 143B provide the in-phase component I and quadrature component Q of the sensing current, respectively, to the controller 140. The controller 140 includes any additional circuitry, such as filters and ADCs, to generate digital data corresponding to the in-phase and quadrature components of the sensing current. The controller 140 samples the sensing current over time at a predetermined sampling rate such as, for example, a 100 KHz sampling rate.

During process 300, the controller 140 generates a plurality of samples for sensing current through the static saw blade 108 when the static saw blade 108 is not in contact with an external object (block 312). As described above, each sample of the sensing current includes an in-phase component I and a quadrature phase component Q. The controller 140 stores data corresponding to the in-phase component I and quadrature phase component Q in the memory 142 for each sample in a plurality of samples.

After identifying the in-phase and quadrature components for the plurality of samples, the controller 140 or an external computing device identifies a centroid value corresponding to the plurality of samples of the sensing current that are generated when the static saw blade 108 is not in contact with an object (block 316). The centroid value includes an in-phase component and a quadrature phase component corresponding to the average in-phase and average quadrature phase components, respectively, in the plurality of samples. In the saw 100, the value of the centroid is stored in the memory 142.

Figure 5:
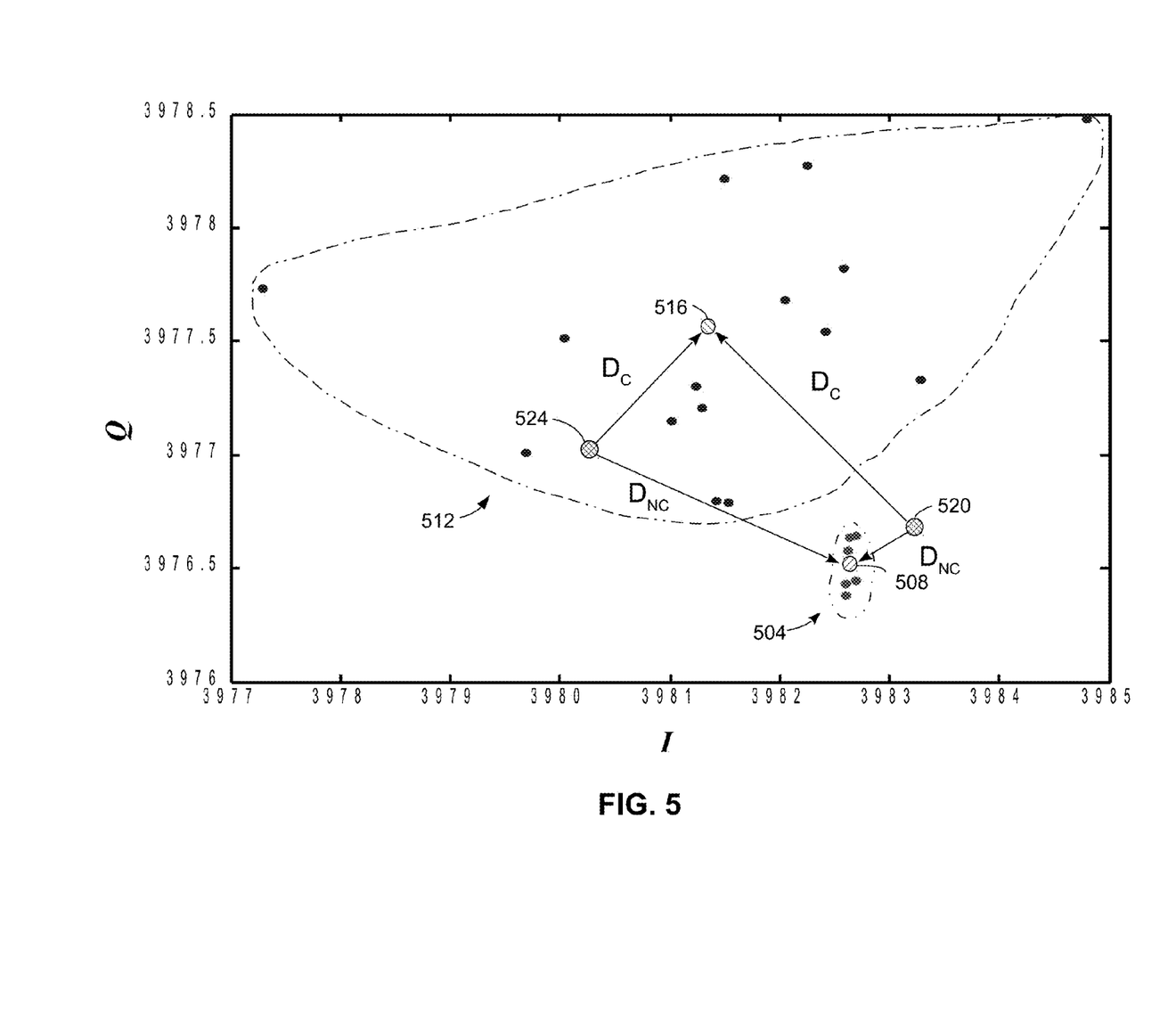
FIG. 5 is a graph depicting in-phase and quadrature components for a plurality of electrical signals that pass through a static implement when the implement is not in contact with an object and when the implement is in contact with an object.

FIG. 5 includes an exemplary depiction of the plurality of samples and the centroid identified for the signal during the processing described with reference to blocks 308-316. FIG. 5 depicts a graphical representation of a plane with the in-phase component I along the horizontal axis and the quadrature phase component Q along the vertical axis. In FIG. 5, the samples 504 are generated when the static saw blade 108 is removed from contact with any external objects. In one embodiment, the samples 504 are grouped together using a clustering algorithm. The centroid 508 represents the average in-phase and quadrature phase component values for the samples 504.

Referring again to FIG. 3, process 300 continues as an operator places a plurality of objects having electrical characteristics corresponding to the human body into contact with the static implement (block 320). In one embodiment, an operator places one or more fingers or other body parts in contact with the static implement if such contact is practical. In another embodiment, the operator places objects that have an electrical conductivity that is similar to the human body into contact with the implement. For example, hot dogs that are commonly sold at grocery stores have an electrical conductivity and other electrical characteristics that are similar to the human body. To simulate the capacitance of the human body for electrical charge, however, these objects may need to be electrically connected to earth ground. A plurality of objects are placed in contact with the static implement to simulate a wide range of potential contact conditions between the static implement and one or more portions of a human body. While the objects are in contact with the static saw blade 108, the controller 140 generates a plurality of samples for the sensing current through the saw blade 108 while the saw blade is in contact with the objects (block 324). The controller 140 identifies the in-phase and quadrature phase components for each of the samples generated when an object is in contact with the static saw blade 108 (block 328). The processing described above with reference to blocks 324 and 328 is performed in the same manner as described above for the processing described with reference to the processing of blocks 308 and 312, respectively.

After identifying the in-phase and quadrature components for the plurality of samples, the controller 140 or external computing device identifies a centroid value corresponding to the plurality of samples of the sensing current that are generated when the static saw blade 108 is in contact with the object (block 332). The centroid value includes an in-phase component and a quadrature phase component corresponding to the average in-phase and average quadrature phase components, respectively, in the plurality of samples generated when the objects are in contact with the saw blade 108. In the saw 100, the value of the centroid is stored in the memory 142.

Referring again to FIG. 5, the exemplary samples 512 depict the samples generated when objects are in contact with the saw blade 108. In one embodiment, the samples 512 are grouped together using a clustering algorithm. The centroid 516 represents the average in-phase and quadrature phase component values for the samples 512. In FIG. 5, the samples 512 that are generated when the static saw blade 108 is in contact with the objects are distributed over a wider region of the I-Q plane compared to the samples 504 that are generated when no objects are in contact with the static saw blade 108. The increased variations in the samples 512 may be due, at least in part, to differences in the electrical conductivity and other electrical characteristics of the objects that contact the static saw blade 108, and the quality of the electrical coupling formed between the objects and the static saw blade 108.

In the saw 100, the controller 140 stores data corresponding to both of the centroids identified for the non-contact and in-contact conditions. In one embodiment, an operator of the saw 100 performs process 300 prior to using the saw 100, and optionally repeats the process 300 to recalibrate the saw 100. In another embodiment, process 300 is performed at a factory or other facility using the saw 100, and the data corresponding to both centroids are stored in the memories of a plurality of saws having the configuration of the saw 100 during the manufacturing process.

Figure 4:
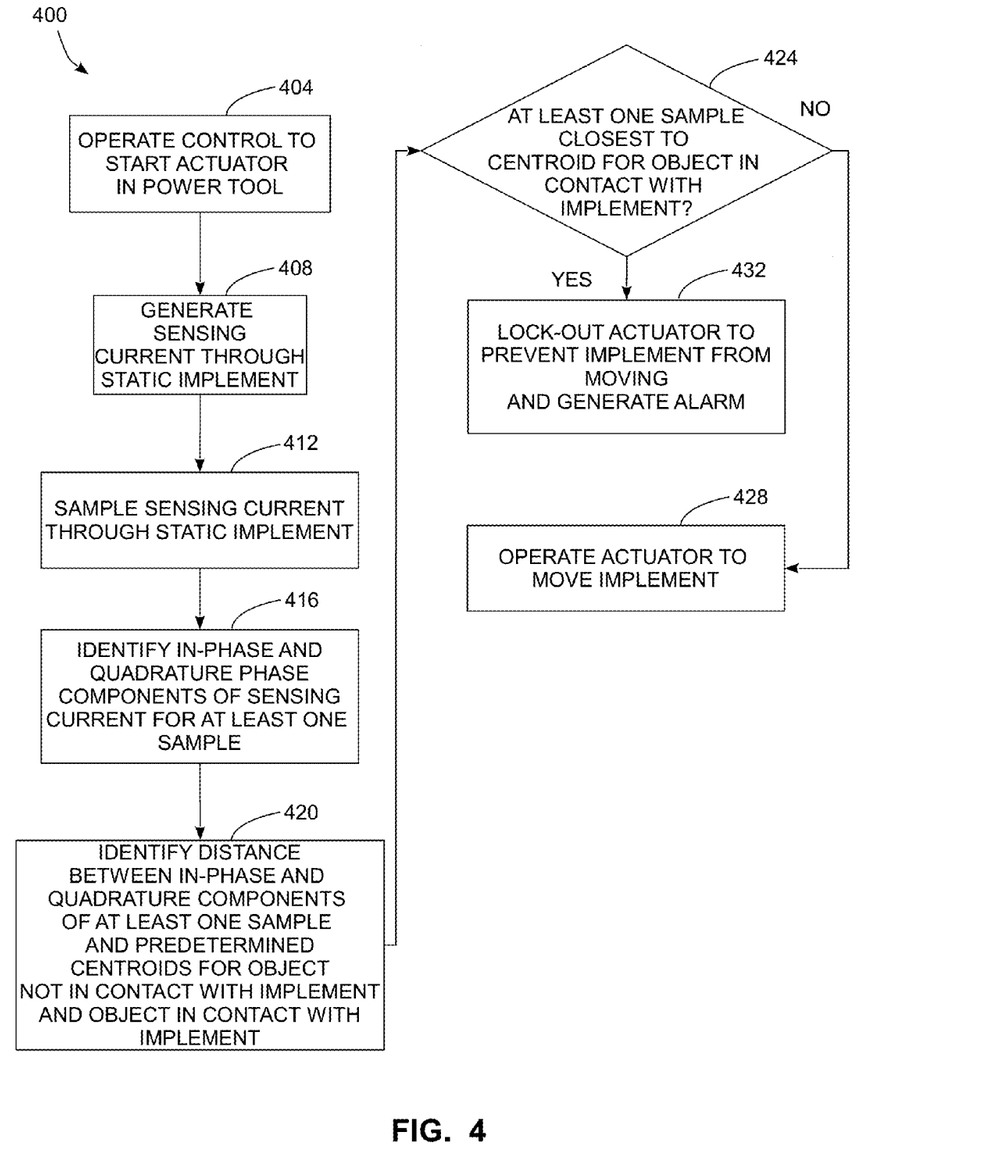
FIG. 4 is a flow diagram of a process for identifying if an object is in contact with a static implement in a power tool when the power tool is activated.

FIG. 4 depicts a process 400 for operation of a power tool that identifies if a static implement is in contact with an object, such as a portion of a human body, when an activation switch is closed to begin operation of the power tool. FIG. 4 is described in conjunction with the saw 100 of FIG. 2 for illustrative purposes. In the discussion below, a reference to the process 400 performing a function or action refers to one or more processors, such as the controller 140, executing programmed instructions stored in a memory to operate components of the power tool to perform the function or action.

Process 400 begins when an operator closes a switch or operates another control device to begin operation of the actuator to move the implement (block 404). In the saw 100, an operator closes the switch 110, which is typically in the form of a button or trigger, to activate the electric motor 112 and rotate the saw blade 108. In some prior art devices, the switch or other control device is placed in an electrical circuit that provides power to the actuator directly when the switch is closed. In the saw 100, however, the switch 110 only generates a request signal to the controller 140 indicating that the operator requests activation of the motor 112. During process 400, the controller 140 either activates the motor 112 in response to identifying that the saw blade 108 is not in contact with external objects, such as a portion of the human body, or locks-out the motor 112 in response to identifying that the saw blade 108 is in contact with an external object.

Process 400 continues as the power tool generates the electrical signal as the sensing current that is passed through the static implement (block 408). As described above with reference to FIG. 2, the amplified time varying electrical signal from the clock source 144 and amplifier 146 passes through the transformer 150 and the capacitor 124 formed from the plate 120 and the saw blade 108. The sensing current generated in the saw 100 during process 400 has the same frequency, magnitude, and waveform as the sensing current generated in the saw 100 during process 300.

During process 400, the controller 140 samples the sensing current (block 412). The controller 140 samples the sensing current in the same manner as the processing described above with reference to block 312. While the controller 140 generates at least one sample during process 400, in some embodiments the controller 140 generates a plurality of samples over a predetermined time period, such as 0.1 to 0.5 seconds, to reduce the effects of random noise on the identified in-phase and quadrature components of the sensing signal. If a plurality of samples is generated, the controller 140 identifies a centroid for the plurality of samples to use in identifying if an object is in contact with the static saw blade 108. The controller 140 also identifies the in-phase and quadrature phase components in each of the samples of the sensing current using the processing described above with reference to blocks 316 and 328 in the process 300 (block 416).

Process 400 continues as the controller 140 identifies a distance between the in-phase and quadrature phase components in the sample or samples and the predetermined centroids for the signals generated when the saw blade 108 is either not in contact with an object or in contact with an object having electrical properties similar to a portion of a human body (block 420). In the context of the process 400, the term "distance" refers to the Pythagorean sum of the squares of the differences between the identified in-phase and quadrature phase components for the sample and the respective in-phase and quadrature phase components in each of the predetermined centroids. For example, if a sample has values (I, Q) of $(I_0, Q_0)$ and a centroid has value of $(I_1, Q_1)$, then the distance D between the sample and the centroid is: $D=\sqrt{(I_0-I_1)^2+(Q_0-Q_1)^2}$. Process 400 identifies two distances, labeled as $D_{NC}$ and $D_C$, corresponding to the distances between the sample and the centroid corresponding to non-contact between the implement and an object, and the centroid corresponding to contact between the implement and an object, respectively.

Referring to both FIG. 4 and FIG. 5, two samples 520 and 524 are shown in the I/Q plane including the centroids 508 and 512. The arrows labeled $D_{NC}$ and $D_C$ depict the straight-line distances between each of the samples 520 and 524 and the centroids 508 and 516, respectively. Process 400 identifies the shorter of the two distances $D_{NC}$ or $D_C$ between the components in the sampled signal and the centroids. If the identified distance between the sample and the non-contact centroid 508 is the shortest (block 424), as illustrated by the sample 520 in FIG. 5, then the controller 140 activates the electric motor 112 to rotate the saw blade (block 428).

If, however, the identified distance between the sample and contact centroid 512 is the shortest (block 428), then the controller 140 performs a lock-out operation for the electric motor 112 and optionally generates an alarm (block 432). The lock-out operation ensures that the motor 112 is not activated shortly after identification that the saw blade 108 is in contact with an object, such as an appendage of a human operator. For example, if the operator inadvertently contacts the blade with a finger when the switch 110 is closed, the lock-out ensures that the motor 112 remains deactivated after the operator withdraws the finger from the saw blade 108. In one embodiment, the operator performs a manual reset operation to clear the lock-out condition. The reset operation typically includes operating a reset switch or other device (not shown) that requires the use of two hands or is physically removed from the implement to ensure that the implement is not in contact with a portion of the human body prior to restarting the power tool.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method for detection of human contact with a non-moving implement in a power tool comprising:
generating a sample of an electrical signal that passes through the non-moving implement;

identifying an in-phase component and quadrature phase component of the sample;

identifying a first distance as a first Pythagorean distance in a two-dimensional plane corresponding to the in-phase and quadrature-phase signals, the first distance being between the identified in-phase component and quadrature phase component of the sample at a first location in the two-dimensional plane and another in-phase component and quadrature phase component of a first centroid at a second location in the two-dimensional plane, the first centroid being of a first cluster of samples in the two-dimensional plane corresponding to human contact with the non-moving implement;

identifying a second distance between the identified in-phase component and quadrature phase component of the sample distance as a second Pythagorean distance in the two-dimensional plane, the second distance being between the first location of the sample and another in-phase component and quadrature phase component of a second centroid at a third location in the two-dimensional plane, the second centroid being of a second cluster of samples in the two-dimensional plane corresponding to no human contact with the non-moving implement; and identifying human contact with the non-moving implement with reference to the first distance being less than the second distance.

2. The method of claim 1 further comprising:
disabling operation of an actuator in the power tool that is configured to move the implement in response to identifying the human contact with the non-moving implement.

3. The method of claim 1 further comprising:
operating an actuator in the power tool to move the implement in response to the second distance being less than the first distance.

4. The method of claim 1 further comprising:
electrically coupling the electrical signal into the non-moving implement of the power tool;
sampling the electrical signal to obtain the first cluster of samples of the electrical signal electrically coupled to the non-moving implement during a first time period during which human contact with the non-moving implement occurs;
sampling the electrical signal to obtain the second cluster of samples of the electrical signal electrically coupled to the non-moving implement during a second time period during which no human contact with the non-moving implement occurs;
identifying the first centroid for the multiple samples of the electrical signal obtained during the first time period;
identifying the second centroid for the multiple samples of the electrical signal obtained during the second time period; and
storing the first centroid and the second centroid in a memory within the power tool for detection of human contact with the non-moving implement.

5. The method of claim 4, the sampling of the electrical signal further comprising:

identifying an in-phase component for each sample of the electrical signal during the first time period and the second time period; and identifying a quadrature component for each sample of the electrical signal during the first time period and the second time period.

6. A power tool comprising:
an actuator configured to move an implement;
a clock source configured to generate a time varying electrical signal that passes through the implement; and
a controller operatively connected to the actuator and configured to sample the electrical signal, the controller being configured to:
  generate a sample of the electrical signal when the actuator is deactivated and the implement is a non-moving implement;
  identify an in-phase component and quadrature phase component of the sample;
  identify a first distance as a first Pythagorean distance in a two-dimensional plane corresponding to the in-phase and quadrature-phase signals, the first distance being between the identified in-phase component and quadrature phase component of the sample at a first location in the two-dimensional plane and another in-phase component and quadrature phase component of a first centroid at a second location in the two-dimensional plane, the first centroid being of a first cluster of samples corresponding to human contact with the non-moving implement;
  identify a second distance as a second Pythagorean distance in the two-dimensional plane, the second distance being between the first location of the sample and another in-phase component and quadrature phase component of a second centroid at a third location in the two-dimensional plane, the second centroid being of a second cluster of samples corresponding to no human contact with the non-moving implement; and
  identify human contact with the non-moving implement with reference to the first distance being less than the second distance.

7. The power tool of claim 6 further comprising:
a memory operatively connected to the controller, the memory being configured for storage of data corresponding to the in-phase component and the quadrature phase component of the first centroid and the in-phase component and the quadrature phase component of the second centroid prior to the generation of the sample.

8. The power tool of claim 6 further comprising:
an activation switch operatively connected to the controller, the controller being further configured to:
  identify the human contact with the non-moving implement in response to operation of the activation switch.

9. The power tool of claim 6, the controller being further configured to:
disable the actuator in response to identifying the human contact with the non-moving implement.

10. The power tool of method of claim 6, the controller being further configured to:
operate the actuator to move the implement in response to the second distance being less than the first distance.

\* \* \* \* \*